(12) United States Patent
Keum et al.

(10) Patent No.: US 12,705,508 B2
(45) Date of Patent: Aug. 11, 2026

(54) METHOD FOR ADDING PREDICTION RESULTS AS TRAINING DATA USING AI PREDICTION MODEL

(71) Applicant: WAYCEN INC., Seoul (KR)

(72) Inventors: Jisoo Keum, Yongin-si (KR); Kyungnam Kim, Suwon-si (KR); Sangil Oh, Seoul (KR)

(73) Assignee: WAYCEN INC., Seoul (KR)

( * ) Notice: Subject to any disclaimer, the term of this patent is extended or adjusted under 35 U.S.C. 154(b) by 659 days.

(21) Appl. No.: 18/031,798

(22) PCT Filed: Oct. 19, 2021

(86) PCT No.: PCT/KR2021/014612
§ 371 (c)(1),
(2) Date: Apr. 13, 2023

(87) PCT Pub. No.: WO2022/092672
PCT Pub. Date: May 5, 2022

(65) Prior Publication Data

US 2023/0385656 A1 Nov. 30, 2023

(30) Foreign Application Priority Data

Oct. 26, 2020 (KR) ........................ 10-2020-0139167

(51) Int. Cl.
*G06N 3/0464* (2023.01)
*G06N 5/022* (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS 9,802,364 B2 * 10/2017 Danks .................. B29C 64/386
11,514,691 B2 * 11/2022 Perera .................... G06V 30/40
(Continued)

FOREIGN PATENT DOCUMENTS

JP 2009-289093 A 12/2009
KR 10-2012-0040429 A 4/2012
(Continued)

*Primary Examiner* — Amresh Singh
(74) *Attorney, Agent, or Firm* — MUNCY, GEISSLER, OLDS & LOWE, P.C.

(57) ABSTRACT

A method for adding prediction results as training data using an AI prediction model, comprises the steps of: arranging an image having a first opposing attribute, the image being from an actual captured image, on a two-dimensional plane so as to be face-to-face with respect to a specific point on the two-dimensional plane; arranging an image having a second opposing attribute, on the two-dimensional plane so as to be orthogonal, with respect to the specific point, to the image having the first opposing attribute; receiving image data of the first and second attributes respectively arranged on the two-dimensional plane; by means of first and second AI prediction models, predicting respective results for the image data of the first and second attributes; converting the respective prediction results into X, Y coordinates, and cumulating and storing same; and selecting data to be included in training by analyzing the predicted results, and adding the selected data as training data.

10 Claims, 5 Drawing Sheets

(56) References Cited

U.S. PATENT DOCUMENTS

2009/0252404 A1* 10/2009 Lecerf .................... G06F 18/41 382/154
2009/0319897 A1* 12/2009 Kotler ................. H04N 1/6013 715/838
2015/0169978 A1* 6/2015 Pillai ...................... G06F 18/23 382/195
2018/0089497 A1* 3/2018 Romanenko ......... G06V 10/255
2019/0034836 A1* 1/2019 Chari .................... G06N 20/20
2019/0130188 A1* 5/2019 Zhou ...................... G06T 7/248
2019/0294990 A1* 9/2019 Lopez De Prado ... G06N 20/00
2020/0242379 A1* 7/2020 Mabuchi .................. G06T 7/73

FOREIGN PATENT DOCUMENTS

KR 10-2019-0078693 A 7/2019
KR 10-2020-0010679 A 1/2020
KR 10-2020-0012334 A 2/2020
KR 10-2020-0072588 A 6/2020
KR 10-2229381 B1 3/2021

* cited by examiner

METHOD FOR ADDING PREDICTION RESULTS AS TRAINING DATA USING AI PREDICTION MODEL

TECHNICAL FIELD

The present invention relates to a method for adding prediction results as training data using artificial intelligence (AI) prediction model and, more specifically, to a method for adding prediction results as training data using AI prediction model, which analyzes continuous AI prediction results for the same target with a complex characteristic to add them as training data.

BACKGROUND ART

As semiconductor technologies such as processors and memories rapidly develop, artificial intelligence (AI) technologies are also developing. Accordingly, services using AI technology are being widely developed in various fields. For example, deep learning technology is attracting attention in the field of AI technology, and shows excellent results in various fields such as data analysis, image recognition, and natural language processing.

In selecting prediction results as data for display and learning, when the prediction result of the image is displayed in the form of a graph assuming it to be time series data, a user may be aware of only its shape and thus may not view two attributes (complex characteristic) together. In addition, when the prediction result of the image is displayed in the form of a table, a user has a lot of numerical data and thus may not visually check the relevance thereof. In addition, when data with similar characteristics of incorrectly predicted data are included in training, it results in an increase in the amount of training data, which may cause overfitting.

In addition, when the data is selected by applying a threshold to the prediction result, it may be desirable in the case of a single characteristic, while it is difficult to set thresholds in the case of a complex characteristic. In addition, when the data is selected by clustering prediction results, there is a problem that clustering is simply divided based on distance without considering results such as noise with low cohesion in the prediction results.

Meanwhile, Korean Patent Publication No. 10-2019-0078693 (hereinafter, referring to Patent Document 1) discloses "Method and apparatus for generating training data based on distribution characteristics of training data", in which the method of generating training data includes classifying training data to be oversampled into isolation training data and normal training data based on distribution characteristics of the training data; determining the amount of additional training data to be oversampled from each of the isolation training data and the normal training data according to a ratio between the isolation training data and the normal training data; and generating additional training data corresponding to each of the isolation training data and the normal training data based on the amount of the training data to be oversampled.

In the case of the Patent Document 1, although there is an advantage in that the amount of training data or the ratio between the training data for the classifier can be appropriately adjusted by oversampling the training data based on the distribution characteristics of the training data, data with similar characteristics of the incorrectly predicted data may be included, so that there is a problem that the amount of training data increases, which causes overfitting. In addition, the Patent Document 1 has a problem in that it is difficult to respond to two attributes (complex characteristic) because it considers only a single characteristic of a certain target.

DISCLOSURE

Technical Problem

Accordingly, the present invention has been made keeping in mind the above problems occurring in the related art, and an objective of the present invention is to provide a method for adding prediction results as training data using AI prediction model, which selects additional training data by analyzing prediction results for a complex characteristic together, in the case of a target with the complex characteristic, when selecting the data for additional training of the learned AI prediction model.

Technical Solution

In order to achieve the above objectives, a method for adding prediction results as training data using an AI prediction model, is to select and add the training data, by training an AI prediction model to implement the method for adding the prediction results as the training data using a computer system, predicting a result for a target capturing image using the AI prediction model, and then analyzing the predicted results, the method including steps of:

a) arranging an image having a first opposing attribute, the image being from an actual captured image of an arbitrary object, on a two-dimensional plane so as to be face-to-face with respect to a specific point on the two-dimensional plane;

b) arranging an image having a second opposing attribute, the image being from the image of the arbitrary object, on the two-dimensional plane so as to be orthogonal, with respect to the specific point, to the image having the first opposing attribute;

c) receiving, by a computer system, image data of the first and second attributes respectively arranged on the two-dimensional plane;

d) predicting, by a first AI prediction model, a result for the image data of the first attribute received by the computer system;

e) predicting, by a second AI prediction model, a result for the image data of the second attribute received by the computer system;

f) converting results predicted by each of the first and second AI prediction models into X and Y coordinates, to cumulatively store same; and g) selecting data to be included in training by analyzing the cumulatively stored prediction results, and adding the selected data as training data.

Herein, in the steps a) and b), the specific point is set to 50% or 0.5 which is a center value, and the upper, lower, left, and right maximum values may be set to 100% or 1.

In addition, in the step f), the X and Y coordinate values may have a value of 0 to 100.

In addition, in the step f), the cumulatively stored prediction results may be brought later when analyzing the prediction results for "same target", and then analyzed again with regard to multiple occurrences of the same target.

In addition, in analyzing the cumulatively stored prediction results in the step g), the prediction results may be analyzed by applying local outlier factor (LOF) analysis.

In addition, in selecting the data in the step g), the data may be selected by analyzing distribution of the prediction results using unsupervised learning and then classifying the prediction results into data results with relatively high cohesion and data results with low cohesion.

In addition, in selecting the data in the step g), the data is classified into data closest to a center of each cluster, data farthest from the center, and data at an intermediate distance between the data closest to the center and the data farthest from the center, which are results of mean shift clustering.

Advantageous Effects

According to the present invention, there is an advantage of selecting data by analyzing the distribution of prediction results using unsupervised learning and then classifying them into results with relatively high cohesion and results with low cohesion.

In addition, there is an advantage of addressing the problem caused from selecting data based on only single characteristic by selecting data in consideration of even prediction results of the complex characteristic.

In addition, there is an advantage of selecting additional training data that should be preferentially included in the learned AI model.

In addition, there is an advantage of selecting data by analyzing the prediction results of the AI model for data that is difficult to select by applying thresholds, as in a non-linear threshold application method.

In addition, there is an advantage of reducing the occurrence of overfitting by selecting only data with similar characteristics.

MODE FOR INVENTION

The terms or words used in this specification and claims should not be construed as being limited to a common or dictionary meaning, but be interpreted as meaning and concept consistent with the technical spirit of the present invention based on the principle that an inventor may properly define concept of terms in order to best describe his or her invention.

Throughout the specification, when a part "includes" a certain element, it means that other components may be further included without excluding other components unless otherwise stated. In addition, terms such as "unit", "module", and "device" described in the specification mean a unit that processes at least one function or operation, it can be implemented in hardware or software or a combination of hardware and software.

Hereinafter, embodiments of the present invention will be described in detail with reference to the accompanying drawings.

Here, prior to description of the embodiments of the present invention, concepts of class and complex characteristic introduced in the present invention will be first described in order to facilitate understanding of the present invention.

Figures 1A, 1B, 1C:
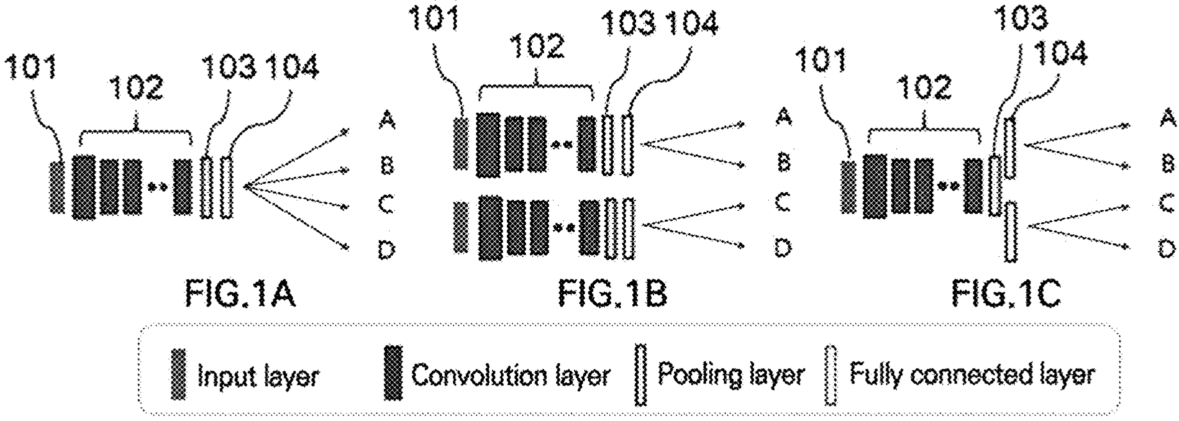
FIGS. 1A, 1B and 1C are diagrams illustrating a one-to-one classification model (FIG. 1A), two one-to-one classification models (FIG. 1B), and one-to-many classification model in a neural network model (FIG. 1C).

FIGS. 1A, 1B and 1C are diagrams illustrating a one-to-one classification model (FIG. 1A), two one-to-one classification models (FIG. 1B), and one-to-many classification model in a neural network model (FIG. 1C).

Referring to FIG. 1A, FIG. 1A shows a one-to-one classification model of the existing neural network model, in which the neural network model includes an input layer 101, one or more convolution layers 102, a pooling layer 103, and a fully connected layer 104. Using this neural network model, when any input is entered, a result value of one of four characteristics, A, B, C, and D, or a probability corresponding to each characteristic may be output. Here, a total sum of the result values may be 100%.

Meanwhile, a certain input may probably have a complex characteristic with multiple results. For example, when A is male, B is female, C is Asian, and D is non-Asian, A and C may be duplicated as the result value.

However, since the total sum of the results is determined to be 100% in the existing neural network model, it is difficult to properly reflect the complex characteristic.

In FIG. 1B, a case in which two one-to-one classification models are used is shown, and in FIG. 1C, one-to-many classification model employed in the present invention is shown.

In FIGS. 1A, 1B and 1C, A and B represent characteristics belonging to class I, and C and D represent characteristics belonging to class II. Classification criteria of Class I and classification criteria of Class II may be different from each other. The characteristic belonging to multiple classes is referred to as a "complex characteristic" in the present invention. An input with a complex characteristic may have multiple characteristics, that is, a characteristic for each class.

Referring to FIG. 1B, when two one-to-one classification models are used, a sum of the predicted probabilities of characteristics A and B is 100%, and similarly a sum of the predicted probabilities of characteristics C and D is 100%. Herein, the prediction result may be accurate, but the amount of computation may increase as two models need to be trained. In addition, since the two models are independently trained, it is difficult to reflect the association between classes.

Referring to FIG. 1C, in the case of the one-to-many model, some layers, namely the convolution layer 102 and the pooling layer 103 are shared between classes, and the fully connected layer 104 is provided for each class. Here, since the fully connected layer 104 is provided for each class, a sum of the predicted probabilities of characteristics A and B is 100%, and a sum of the predicted probabilities of characteristics C and D is also 100%. Accordingly, since the prediction results in class I and the prediction results in class II each are provided, more accurate prediction results may be obtained compared to FIG. 1A. In addition, since the convolution layer 102 is shared between classes, it is possible to reflect the association between classes while reducing the amount of computation compared to the model in FIG. 1B.

Then, an embodiment of the present invention will be described based on the above foregoing.

Figure 2:
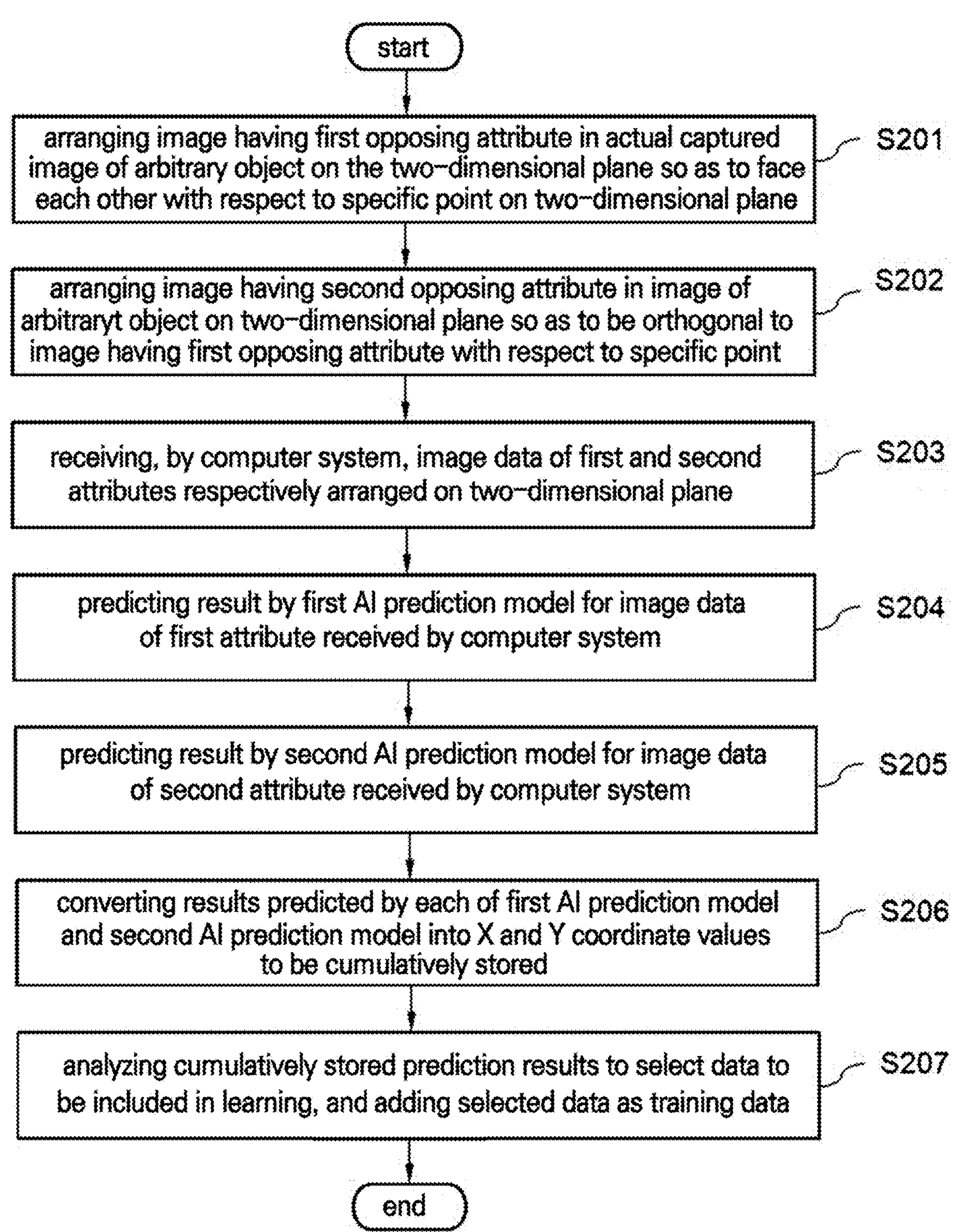
FIG. 2 is a flowchart illustrating an execution process of a method for adding prediction results as training data using AI prediction model, according to the present invention.

FIG. 2 is a flowchart illustrating an execution process of a method for adding prediction results as training data using AI prediction model, according to the present invention.

Figure 3:
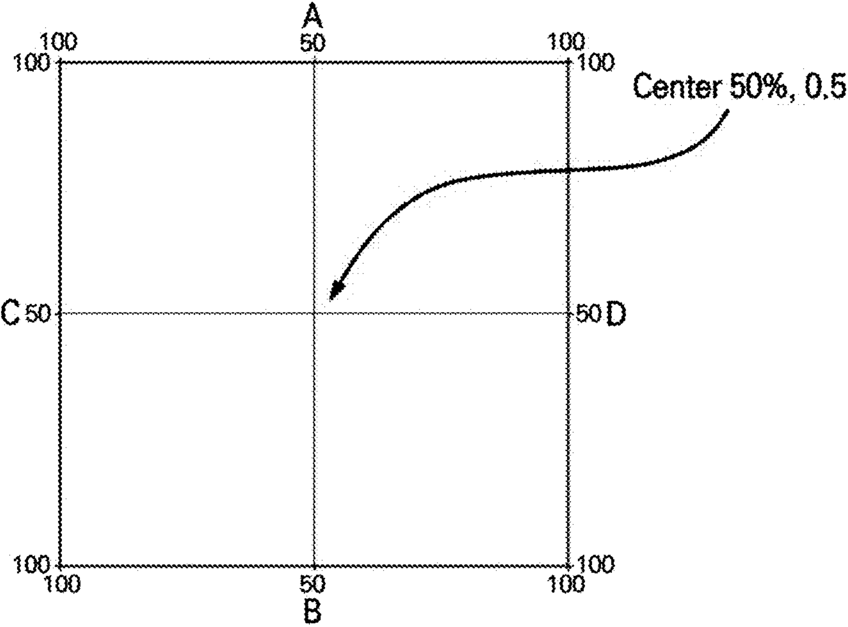
FIG. 3 is a diagram illustrating that first and second opposing attributes are arranged on a plane in a method for adding prediction results as training data using AI prediction model, according to the present invention.

Referring to FIG. 2, a method for adding prediction results as training data using AI prediction model according to the present invention is to select and add the training data, by training an AI prediction model (not shown) to implement the method for adding the prediction results as the training data using a computer system (or processor), predicting a result for the target capturing image using the AI prediction model, and then analyzing the predicted results. First, as shown in FIG. 3, an image having a first opposing attribute (for example, A-B) in an actual captured image of an arbitrary object is arranged on the two-dimensional plane so as to face each other with respect to a specific point on a two-dimensional plane (step S201).

An image having a second opposing attribute (for example, C-D) in the image of the arbitrary object is arranged on the two-dimensional plane so as to be orthogonal to the image having the first opposing attribute with respect to a specific point (step S202). Here, in the steps S201 and S202, the specific point may be set to 50% or 0.5 which is a center value, and the upper, lower, left, and right maximum values may be set to 100% or 1.

As such, when the images having the first and second opposing attributes on the two-dimensional plane are arranged, the computer system receives the image data of the first and second attributes respectively arranged on the two-dimensional plane (step S203).

Then, a first AI prediction model predicts the result for the image data of the first attribute received by the computer system (step S204). Here, the first AI prediction model may predict the result based on pre-learned data (e.g., pre-learned data for the first attribute data).

In addition, a second AI prediction model predicts the result for the image data of the second attribute received by the computer system (step S205). Here, similarly, the second AI prediction model may predict the result based on pre-learned data (e.g., pre-trained data for the second attribute data).

Then, the results predicted by each of the first AI prediction model and the second AI prediction model are converted into X and Y coordinate values to be cumulatively stored (step S206). Here, the X and Y coordinate values may have values of 0 to 100. Here, the cumulatively stored prediction results may be brought when analyzing the prediction result for the "same target" later, and then analyzed again with regard to multiple occurrences of the same target. Here, although it has been described that the results are predicted by the first and second AI prediction models (i.e., two AI prediction models) for the images having the first and second attribute in steps S204 to S206, respectively, it is not limited to predicting the results by each of the two AI prediction models, but the results may be predicted by one AI prediction model for the images having the first and second attributes.

Figure 4A:
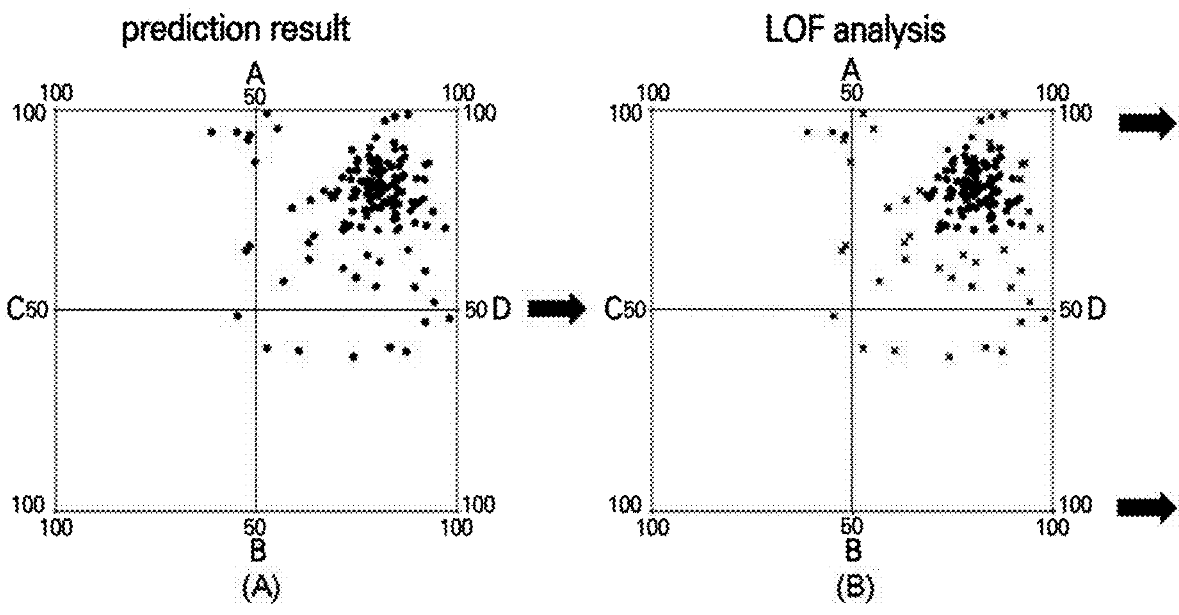
FIGS. 4A and 4B are diagrams illustrating a process of selecting data by analyzing the distribution of prediction results and classifying the prediction results into data results with high cohesion and data results with low cohesion.
Figure 4B:
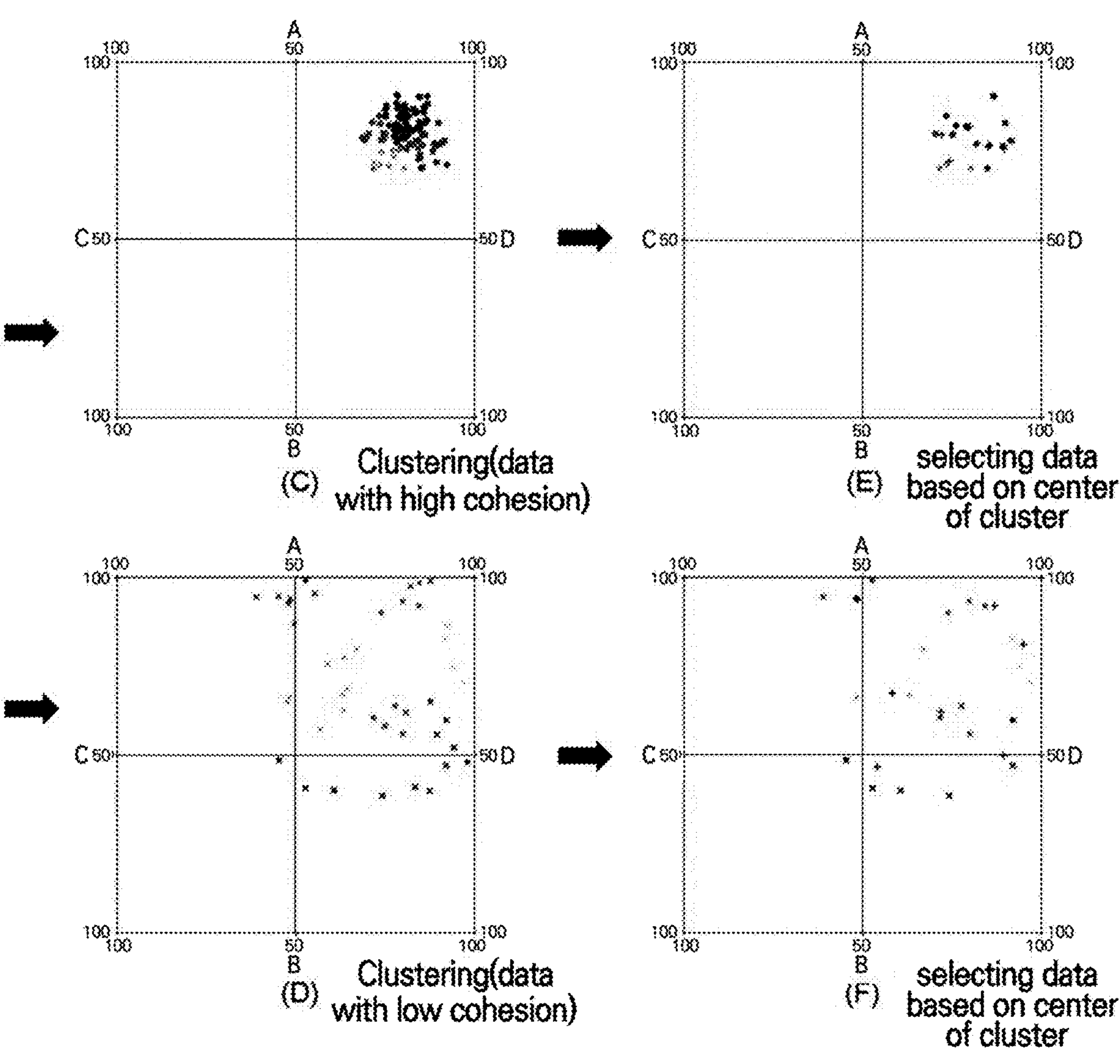

Hereinafter, the cumulatively stored prediction results are analyzed to select data to be included in learning, and the selected data are added as training data (step S207). Here, in selecting the data, as shown in FIGS. 4A and 4B, the data may be selected by analyzing the distribution of prediction results using unsupervised learning and then classifying the prediction results into data results with relatively high cohesion and data results with low cohesion. In FIGS. 4A and 4B, (A) indicates the prediction result, (B) indicates the LOF analysis result, (C) indicates clustering (data with high cohesion), (D) indicates clustering (data with low cohesion), and (E) and (F) indicate the results of selecting the data based on the center of each cluster.

In addition, in selecting data in step S207, it is possible to select data closest to the center of each cluster, data farthest from the center, and data at an intermediate distance between data closest to the center and data at a furthest distance from the center, which are the results of Mean Shift Clustering.

In addition, in selecting data in step S207, it is also possible to select the data by setting conditions on the distance based on the distance from the center of each cluster, which is the result of Mean Shift Clustering. For example, it is possible to also select the data by setting the condition for the distance, such as N pieces of data which are closest, or N pieces of data which are furthest, N pieces of data which are at intermediate distance, based on the distance from the center of each cluster.

FIGS. 5A, 5B, 5C and 5D are diagrams showing the data selection results considering the cohesion according to the method of the present invention, and the data selection results reflecting only the data distribution of the existing method, with respect to the prediction results.

Figures 5A, 5B, 5C, 5D:
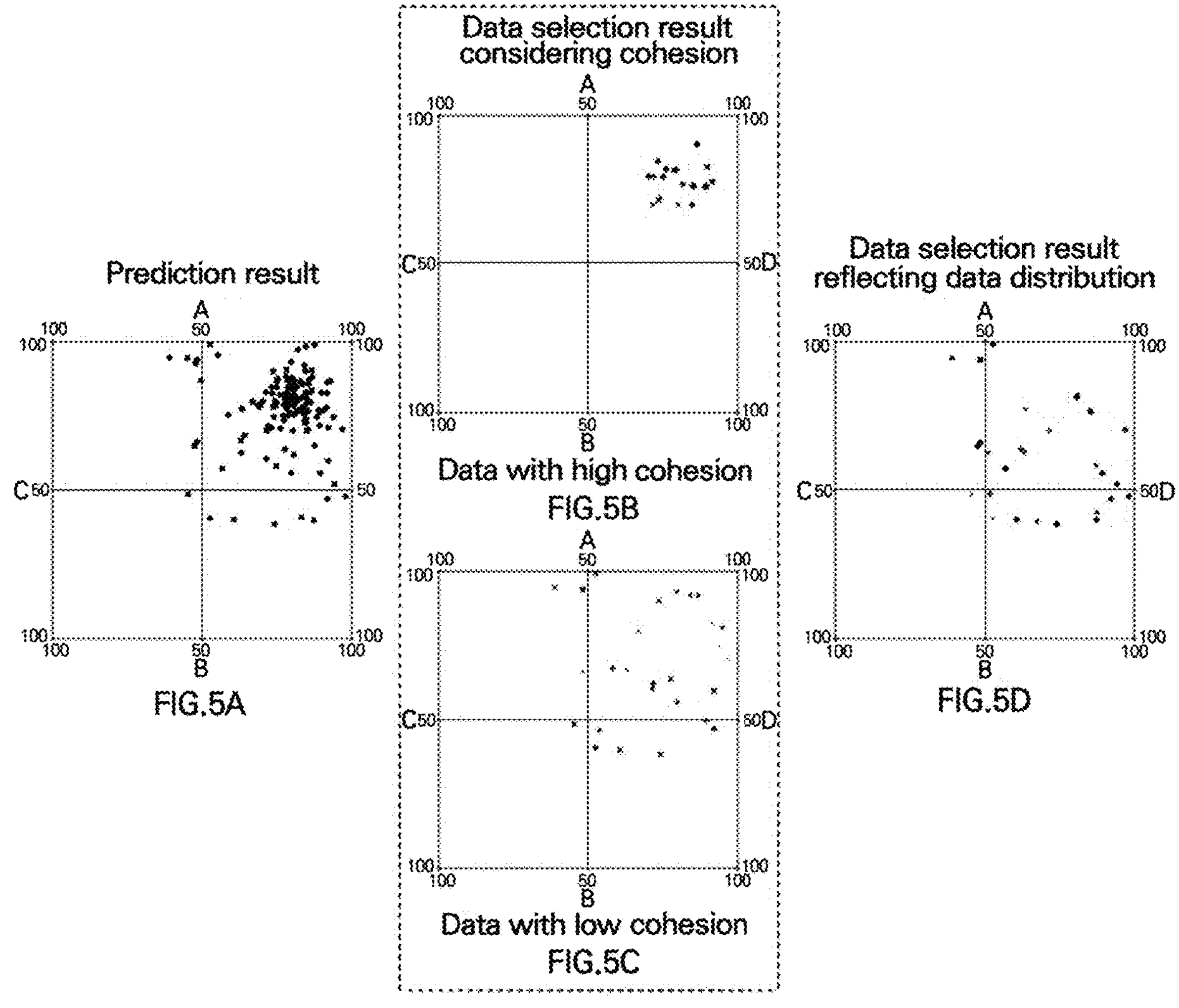
FIGS. 5A, 5B, 5C and 5D are diagrams illustrating the data selection results considering the cohesion according to the method of the present invention, and the data selection results reflecting only the data distribution of the existing method, with respect to the prediction results.

Referring to FIGS. 5A, 5B, 5C and 5D, the data is selected by considering both data with high cohesion as in FIG. 5B and data with low cohesion as in FIG. 5C, in consideration of the degree of aggregation, as indicated by a dotted box, for the predicted result as shown in FIG. 5A, according to the method of the present invention. That is, only data with similar characteristics is selected. Therefore, it is possible to reduce the possibility of overfitting in the existing method of selecting data by reflecting only the data distribution as shown in FIG. 5D.

As described above, the method for adding prediction results as training data using AI prediction model according to the present invention may allow the data to be selected by analyzing the distribution of prediction results using unsupervised learning and then classifying the prediction results into results with relatively high cohesion and results with low cohesion.

In addition, there is an advantage of addressing the problem caused from selecting data based on only single characteristic by selecting data in consideration of even prediction results of the complex characteristic.

In addition, there is an advantage of selecting additional training data that should be preferentially included in the learned AI model.

In addition, there is an advantage of selecting data by analyzing the prediction results of the AI model for data that is difficult to select by applying thresholds, as in a non-linear threshold application method.

In addition, there is an advantage of reducing the occurrence of overfitting by selecting only data with similar characteristics.

Although the present invention has been described in detail through preferred embodiments, the present invention is not limited thereto, but it is obvious to those skilled in the art that various changes and applications can be made without departing from the technical spirit of the present invention. Accordingly, the true scope of protection of the present invention should be interpreted by the following claims, and technical ideas within the equivalent range should be construed as being included in the scope of the present invention.

The invention claimed is:

1. A method for adding prediction results as training data using an AI prediction model, comprising steps of:

a) arranging a first image having a first opposing attribute, the first image being from an actual captured image of an arbitrary object, on a two-dimensional plane so as to be face-to-face with respect to a specific point on the two-dimensional plane;

b) arranging a second image having a second opposing attribute, the second image being from the image of the arbitrary object, on the two-dimensional plane so as to be orthogonal, with respect to the specific point, to the first image having the first opposing attribute;

c) receiving, by a computer system, image data of the first and second attributes respectively arranged on the two-dimensional plane;

d) predicting, by at least one AI prediction model, a first result for the image data of the first attribute received by the computer system;

e) predicting, by the at least one AI prediction model, a second result for the image data of the second attribute received by the computer system;

f) converting the first and second results predicted by each of the at least one AI prediction model into X and Y coordinates, to cumulatively store same; and g) selecting data to be included in training by analyzing the X and Y coordinates of the cumulatively stored first and second results, and adding the selected data as training data.

2. The method of claim 1, wherein in the steps a) and b), the specific point is set to 50% or 0.5 which is a center value, and the upper, lower, left, and right maximum values are set to 100% or 1.

3. The method of claim 1, wherein in the step f), the X and Y coordinate values have a value of 0 to 100.

4. The method of claim 1, wherein in the step f), the cumulatively stored first and second results are brought later when analyzing the first and second results for a same target, and then analyzed again with regard to multiple occurrences of the same target.

5. The method of claim 1, wherein the at least one AI prediction model includes first and second AI prediction models, and in the steps d), e) and f), with regard to the image data of the first and second attributes, the first and second results are predicted by the first and second AI prediction models, respectively.

6. The method of claim 1, wherein in analyzing the cumulatively stored prediction results in the step g), the first and second results are analyzed by applying local outlier factor (LOF) analysis.

7. The method of claim 1, wherein in selecting the data in the step g), the data is selected by analyzing distribution of the X and Y coordinates of the first and second results using unsupervised learning and then classifying the first and second results into data results with relatively high cohesion and data results with low cohesion.

8. The method of claim 1, wherein in selecting the data in the step g), the data is classified into data closest to a center of each cluster, data farthest from the center, and data at an intermediate distance between the data closest to the center and the data farthest from the center, which are results of mean shift clustering.

9. The method of claim 1, wherein in selecting the data in the step g), the data is selected by setting conditions based on a distance from a center of each cluster, which are results of mean shift clustering.

10. The method of claim 1, wherein the at least one AI prediction model includes a single AI prediction model, and in the steps d), e) and f), with regard to the image data of the first and second attributes, the first and second results are predicted by the single AI prediction model.

* * * * *